United States Patent [19]
Cowan et al.

[11] Patent Number: 4,588,703
[45] Date of Patent: May 13, 1986

[54] POLYOLEFIN POLYMERIZATION PROCESS AND CATALYST

[75] Inventors: Kiplin D. Cowan; Dale E. Pierce; Oscar D. Nowlin, all of Bartlesville, Okla.

[73] Assignee: Phillips Petroleum Company, Bartlesville, Okla.

[21] Appl. No.: 632,082

[22] Filed: Jul. 18, 1984

[51] Int. Cl.$^4$ ............................ C08F 4/62; C08F 4/64; C08F 4/68
[52] U.S. Cl. ........................................ 502/111; 502/104; 502/113; 502/117; 502/119; 502/125; 502/127; 502/128; 502/129; 502/131; 502/134; 526/125; 526/137; 526/143; 526/127; 526/114; 526/142
[58] Field of Search ............... 502/104, 111, 113, 117, 502/119, 125, 127, 128, 129, 131, 134

[56] References Cited

U.S. PATENT DOCUMENTS

| | | | |
|---|---|---|---|
| 3,094,568 | 6/1963 | Hay et al. | 502/117 X |
| 4,363,746 | 12/1982 | Capshew | 502/169 X |
| 4,384,087 | 5/1983 | Capshew | 526/114 |
| 4,394,291 | 7/1983 | Hawley | 502/117 |
| 4,477,588 | 10/1984 | Hawley | 502/119 |

Primary Examiner—Patrick P. Garvin
Attorney, Agent, or Firm—Edward L. Bowman

[57] ABSTRACT

An olefin polymerization catalyst prepared by reacting a metal dihalide and a transition metal, then reacting that component with a precipitating agent, and then reacting the resulting solid with an activating component, wherein multiple activation steps are used so that it is possible to obtain a given level of activity with less activating component.

23 Claims, No Drawings

POLYOLEFIN POLYMERIZATION PROCESS AND CATALYST

POLYOLEFIN POLYMERIZATION PROCESS AND CATALYST

This invention relates to the homo- or co-polymerization of alpha olefins. In another aspect, this invention relates to novel catalysts useful for the polymerization of alpha olefins.

U.S. Pat. No. 4,384,087 and U.S. Pat. No. 4,394,291, the disclosures of which are incorporated herein by reference, disclose highly active polymerization catalysts prepared by reacting a metal dihalide and a transition metal compound and then reacting that product with a precipitating agent and then activating the resulting solid with at least one halogen containing compound.

It was previously thought that optimum results would be obtained when the weight ratio of the activating component to the solid was in the range of 10:1 to 1:10. It has, however, now been found that even higher levels of the activating component often result in more active catalysts. Unfortunately, the use of higher levels of the activating component results in significant increases in the cost of preparing the catalyst.

An object of the present invention is to provide a way in which a given level of activity can be obtained with a smaller quantity of activating component.

Still another object of the present invention is to provide an improved method of preparing catalysts of the type disclosed in the two above-mentioned patents.

SUMMARY OF THE INVENTION

In accordance with the present invention, the catalyst is prepared by (1) reacting reactants comprising (a) a metal dihalide wherein the metal dihalide is selected from Groups IIA and IIB of the Periodic Table and (b) a transition metal compound to produce a first catalyst component, then (2) reacting that first component with a precipitating agent, then (3) reacting the resulting solid with a first portion of the activating component, and then (4) reacting that solid with at least one more portion of the activating component.

DETAILED DESCRIPTION OF THE INVENTION

Examples of Group IIA and IIB metal halides include, for example, the dihalides of beryllium, magnesium, calcium, and zinc. Dichlorides are preferred. The specifically preferred dihalide is magnesium dichloride.

The transition metal compounds comprise those wherein the transition metal is selected from the Groups IVB and VB and the transition metal is bonded to at least one atom selected from the group consisting of oxygen, nitrogen, and sulfur and said oxygen, nitrogen, and sulfur atoms are in turn bonded to a carbon of a carbon-containing radical.

The transition metal is generally selected from titanium, zirconium, and vanadium although other transition metals can be employed. Excellent results have been obtained with titanium compounds and they are preferred. Some of the titanium compounds suitable for use in the invention include for example titanium tetrahydrocarbyloxides, titanium tetraimides, titanium tetraamides and titanium tetramercaptides. Other transition metal compounds include, for example, zirconium tetrahydrocarbyloxides, zirconium tetraimides, zirconium tetraamides, zirconium tetramercaptides, vanadium tetrahydrocarbyloxides, vanadium tetraimides, vanadium tetraamides and vanadium tetramercaptides.

The titanium tetrahydrocarbyloxides are the preferred titanium compounds because they produce excellent results and are readily available. Suitable titanium tetrahydrocarbyloxide compounds include those expressed by the general formula

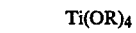

$Ti(OR)_4$ wherein each R is individually selected from an alkyl, cycloalkyl, aryl, alkaryl, and aralkyl hydrocarbon radical containing from about 1 to about 20 carbon atoms per radical and each R can be the same or different. Titanium tetrahydrocarbyloxides in which the hydrocarbyl group contains from about 1 to about 10 carbon atoms per radical are most often employed because they are more readily available. Suitable titanium tetrahydrocarbyloxides include, for example, titanium tetramethoxide, titanium dimethoxidediethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide and titanium tetraphenoxide.

Of the titanium tetrahydrocarbyloxides, titanium tetraalkoxides are generally preferred and titanium tetra-n-butoxide is particularly preferred because of the excellent results obtained employing this material. Titanium tetra-n-butoxide is also generally available at a reasonable cost.

The molar ratio of the transition metal compound to the metal halide compound can be selected over a relatively broad range. Generally the molar ratio is within the range of about 10:1 to about 1:10; however, the most common molar ratios are within the range of about 2:1 to about 1:2. When titanium tetrahydrocarbyloxide and magnesium dichloride are employed to form a composition of matter of the invention, a molar ratio of titanium to magnesium of about 1:2 is presently recommended.

The metal halide compound and the transition metal compound employed in the present invention are normally mixed together by heating, e.g. refluxing, in a suitable dry (essential absence of water) solvent or diluent, which is essentially inert to these components and the product produced. By the term "inert" is meant that the solvent does not chemically react with the dissolved components such as to interfere with the formation of the product or the stability of the product once it is formed. Such solvents or diluents include, for example, n-pentane, n-heptane, methylcyclohexane, toluene, xylenes and the like. It is emphasized that aromatic solvents are preferred, such as for example xylene because the solubility of the metal halide compound and the transition metal compound is higher in aromatic solvents as compared to aliphatic solvents, particularly at low temperatures. Such mixing temperatures are generally within the range of from about 0° C. to about 50° C. and preferably from about 10° C. to about 30° C.. Generally the amount of solvent or diluent employed can be selected over a broad range. Usually the amount of solvent or diluent is within the range of about 20 to about 100 cc per gram of metal dihalide. The temperature employed during the heating step can also be selected over a broad range. Normally the heating temperature is within the range of about 15° C. to about 150° C. when the heating step is carried out at atmospheric pressure. Obviously the heating temperatures employed could be higher if the pressure employed is above atmospheric pressure. The pressure employed during the heating step does not appear to be a significant parameter. In addition to the above noted solvents or diluents, more polar solvents or diluents such as nitrobenzene and halogenated hydrocarbons, e.g. methylene chloride, chlorobenzene and 1,2-dichloroethane can be used. Mixed solvents or diluents, such as for example, a mixture of n-hexane and tetrahydrofuran having a volume/volume ratio of, for example, about 50/50 can be employed in solubilizing hydrocarbon-soluble metal dihalides which are relatively difficult to solubilize, such as, for example, zinc dichloride and the like. Other suitable mixtures of two or more of the above solvents to solubilize the reagents of the first catalyst component can of course also be used and can be readily determined by one of ordinary skill in the art.

Generally, the time required for heating these two components together is within the range of about 5 minutes to about 10 hours, although in most instances a time within the range of about 15 minutes to about 3 hours is sufficient. Following the heating operation, the resulting solution can be filtered to remove any undissolved material or extraneous solid, if desired.

In some preferred embodiments of the present invention one or more electron donors are employed in preparing the first catalyst component. Typical electron donors include electron donors such as ammonia, hydroxylamine, alcohols, ethers, carboxylic acids, esters, acid chlorides, amides, nitriles, amines, and substituted and unsubstituted phenols, naphthols and their sulfur-containing analogs, i.e. thiophenols. The preferred compounds are aromatic compounds selected from the group consisting of phenols, thiophenols, naphthols, aralkyl alcohols, aromatic acids, and aromatic esters.

In the preparation of catalysts of the type disclosed in U.S. Pat. No. 4,384,087 it is generally preferred to use an anhydrous metal dihalide, i.e. a metal halide containing less than 1 mole of water per mole of metal dihalide. In other embodiments, however, it is desirable to employ a metal dihalide having water or alcohol complexed with the metal dihalide.

Alkanols that are considered to be suitable include the non-tertiary aliphatic alcohols containing 1 to 12 carbon atoms per molecule, more preferably 1 to 6 carbon atoms per molecule, and most preferably 1 to 4 carbon atoms per molecule. Specific examples of such alcohols include methanol, ethanol, 1-propanol, 2-propanol, 1-butanol, 2-butanol, 2-methyl-2-propanol, 1-pentanol, 3-methyl-1-butanol, 1-hexanol, 3-hexanol, 1-octanol, 1-dodecanol, and the like and mixtures thereof. Methanol is presently preferred for reasons of efficacy in producing active catalysts as well as for economy.

In an especially preferred embodiment the first component is prepared using $MgCl_2$ that contains 0.5 to 1.5 moles of water per mole of $MgCl_2$ and that is substantially free of organic compounds or $MgCl_2$ that contains less than 0.5 moles of water per mole of $MgCl_2$ and 0.2 to 1.5 moles of alcohol per mole of $MgCl_2$. In this embodiment, a benzoic acid ester is also used in making the first catalyst component.

The term benzoic acid ester is used generically to include substituted as well as unsubstituted benzoic acid esters. Typical examples include ethyl benzoate, ethyl p-methoxybenzoate, ethyl toluate ethyl p-butoxybenzoate, and butyl benzoate. The preferred benzoic acid esters are those having 8 to 12 carbon atoms per molecule.

In an especially preferred embodiment, a phenol is employed in conjunction with the benzoic acid ester in making the first catalyst component. The term "phenol" is used herein to refer to substituted as well as unsubstituted phenols. Typical examples include phenol, o-methyl phenol, m-methyl phenol, p-methyl phenol, 4-phenyl phenol, o-fluorophenol, m-fluorophenol, p-fluorophenol, p-sec-butyl phenol, p-ethyl phenol, p-isopropyl phenol, p-tertbutyl phenol, p-methoxy phenol, p-cyanophenol, and p-nitrophenol.

The currently preferred combination of ester and phenol is 4-phenyl phenol and ethyl benzoate. The total number of moles of 4-phenyl phenol and ethyl benzoate employed can affect the activity and selectivity of the resulting catalyst. Typically, the ratio of the sum of the moles of those two electron donors to the moles of the titanium alkoxide are in the range of about 5/1 to 1/5, more preferably 3/1 to 2/1. Most preferably ½ mole of ethyl benzoate is employed per mole of titanium alkoxide.

The second catalyst component is a precipitating agent selected from the group consisting of organometallic compounds in which the metal is selected from metals of Groups I to III of the Mendeleev Periodic Table, metal halides and oxygen-containing halides of elements selected from Groups IIIA, IVA, IVB, VA, and VB of the Mendeleev Periodic Table, hydrogen halides, and organic acid halides expressed as

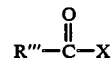

wherein $R'''$ is an alkyl, aryl, cycloalkyl group or combinations thereof containing from 1 to about 12 carbon atoms and X is a halogen atom.

Some organometallic compounds in which the metal is selected from metals of Group I, Group II, and Group III of the Mendeleev Periodic Table suitable for use as the second component include, for example, lithium alkyls, Grignard reagents, dialkyl magnesium compounds, dialkyl zinc compounds, organoaluminum compounds, etc. The organometallic compound of the second catalyst component is generally an organoaluminum halide compound which includes for example, dihydrocarbylaluminum monohalides of the formula $R'_2AlX$, monohydrocarbylaluminum dihalides of the formula $R'AlX_2$ and hydrocarbylaluminum sesquihalides of the formula $R'_3Al_2X_3$ wherein each $R'$ in the above formulas is individually selected from linear and branched chain hydrocarbyl radicals containing from 1 to about 20 carbon atoms per radical and can be the same or different and each X is a halogen atom and can be the same or different. Some suitable organoaluminum halide compounds include, for example, methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide, and the like. Ethylaluminum sesquichloride, ethylaluminum dichloride, and diethylaluminum chloride have been employed with good results and are preferred. The most preferred organoaluminum halide compound is ethylaluminum sesquichloride, which produced the best results.

In the preferred embodiments an organoaluminum halide precipitating agent is employed.

The reaction of the organoaluminum halide with the first catalyst component can be carried out by merely adding the organoaluminum halide to a solution of the first component. It is, however, currently preferred to add a hydrocarbon solution of the halide to the first component solution.

The temperature employed for reacting the second catalyst component, i.e., the organoaluminum halide, and the first catalyst component can be selected over a broad range. Generally, the temperature employed is within a range of about 0° C. to about 50° C. or higher, while temperatures within the range of 20° C. to about 30° C. were most often employed. Since heat is evolved when the first catalyst component and the second catalyst component are mixed, the mixing rate is adjusted as required and additional cooling is employed in order to maintain a relatively constant mixing temperature. It has been found preferable to add the second component to the first component. After completing the mixing, the resulting slurry is stirred or agitated for a sufficient time, generally within a range of about 15 minutes to about 5 hours to insure that mixing of the components is complete. Thereafter, stirring is discontinued and the solid product recovered by filtration, decantation, and the like. The product is then washed with a suitable material such as a hydrocarbon, e.g., n-pentane, n-heptane, cyclohexane, benzene, xylenes and the like, to remove any soluble material which may be present. The product is then dried and stored under dry nitrogen.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active olefin polymerization catalyst.

The activating component is a halogen ion exchanging source, i.e. a component capable of reacting with the solid to increase its halogen content and increase its polymerization activity. Some typical examples include halogen containing compounds of elements of Groups IVA, VA, IVB, and VB. Typical examples include chlorine-containing compounds of Si, Ge, Sn, P, C, Ti, V, and Zr. Some specific compounds of that type include $COCl_2$, $PCl_3$, $SiCl_4$ $SnCl_4$, $CCl_4$, acid chlorides of the formula R'COCl where R' is an aliphatic or aromatic radical containing 1 to 20 carbon atoms, $TiCl_4$, $HSiCl_3$, $VOCl_3$, $ZrCl_4$. It is generally preferred to employ an activating component comprising $TiCl_4$. An especially preferred activating component comprises a mixture of $TiCl_4$, $HSiCl_3$ and $SiCl_4$.

The reaction between the solid product resulting from the reaction of the first and second components with the activating component can be carried out in a neat mixture of the activating component or in a liquid medium in which the activating component is soluble. Generally, for best results the solid is washed with a liquid hydrocarbon before being contacted with the activating component.

In accordance with the present invention the activation is carried out by contacting the solid with at least two separate portions of the activating component. Preferably, after each activation step the activating component liquid is separated from the solid before the solid is subjected to the next activation step.

The temperature for the activation steps can vary over a relatively broad range; however, for practical purposes it would generally be in the range of 0° C. to 150° C., more preferably 20° C. to 110° C., still more preferably 40° C. to 100° C.. It has been noted that the higher temperatures give a higher activity in the first activation but that the increase in activity in the subsequent activations leveled out more quickly and gave lower ultimate activity than when lower temperatures were employed.

It was also noted that at the higher temperatures each successive activation resulted in a catalyst which produced polymer having a lower flexural modulus. Thus at temperatures of 90° and 110° C. it would generally not be advisable to use more than two activations. At lower temperatures the effect of multiple activation upon flexural modulus was not as noticeable. For example a catalyst subjected to four activations at 50° C. and one subjected to four activations at 110° C. were found to have about the same activity, but the flexural modulus obtained with the catalyst activated at 50° C. was 1612 MPa while the flexural modulus obtained with the 110° C. activation was only 1323 MPa.

The time for each activation step can vary over a wide range and is generally within the range of about 10 minutes to about 10 hours. The time needed to obtain the maximum amount of activation in each step can readily be determined by routine experimentation. For activation temperatures in the range of 70°–90° C. times in the range of 30 to 120 minutes have been found quite suitable.

The weight ratio of the activating component to the solid for each activating step can vary over a wide range, generally however, one would want to use a ratio in the range of about 10:1 to 1:10 and more generally about 7:1 to 1:4. Since one of the objectives of this invention is to obtain the high activity with less activating component, it is of course preferred that the total amount of activating component used in all the activating steps be less than that which would give optimum activity using only a single activation. Thus generally the weight ratio of all the activating component used per solid would be less than about 20/1, more preferably less than 15/1, and still more preferably less than 10/1.

In some cases it may be desirable to employ a catalyst having prepolymer. The prepolymer can be formed on the catalyst either before or after the activation treatment. Typically the prepolymer is formed by reacting a small amount of a polymerizable monomer with the catalyst, generally while employing a cocatalyst. Typical monomers used in prepolymerization include aliphatic mono-1-olefins, preferably containing 2 to 10 carbon atoms per molecule and conjugated diolefins containing 4 to 8 carbon atoms. The cocatalyst is generally selected from any of the cocatalysts to be described later for use when the inventive catalyst is used in preparing polymers.

The weight percent of prepolymer that can be deposited based on the total weight of the prepolymerized catalyst is preferably from about 1 to about 50%, more preferably about 3 to 40%, and most preferably about 5 to 10%.

More detail regarding the formation of catalysts having prepolymer is provided in U. S. 4,325,837 the disclosure of which is incorporated herein by reference.

The catalyst of the present invention can be used in the polymerization of olefins. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process, a gas phase process, or a solution form process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from about 8 to about 14 carbon atoms per molecule, and include for example styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

The inventive catalysts are particularly well suited for producing stereoregular polypropylene, many offering potential for high rates as well as low soluble polymer formation.

Polymerization may be conducted in a liquid phase, in the presence or absence of an inert hydrocarbon diluent, or in a gas phase. In the polymerization of propylene, particularly satisfactory results have been attained operating in the presence of an aliphatic or aromatic hydrocarbon diluent, liquid under the polymerization conditions, such as propylene, toluene, gasoline, and the like.

While it may not be necessary in all instances to employ a cocatalyst with the catalyst of the present invention, the use of cocatalysts is recommended for best results. The organometallic cocatalysts suitable for use in accordance with the invention can be selected from among the hydrides and organometallic compounds of metals of Groups IA, II, and IIIA of the Periodic Table. Of the organometallic cocatalysts, organoaluminum compounds such as those described above as suitable for use as the second component of the catalyst, are preferred with the most preferred organoaluminum cocatalysts being compounds of the formula $R_3Al$ which include, for example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transition metal compound of the first catalyst component is within a range of about 1:1 to about 1500:1. For catalyst systems wherein the cocatalyst comprises at least one organoaluminum compound typically there is employed about 0.25 to 15 milligrams of the titanium-containing component per mmole of organoaluminum cocatalyst.

In many cases the catalyst is preferably used with a multicomponent cocatalyst system comprising triethylaluminum (TEA), an aromatic ester such as ethyl anisate (EA), ethyl benzoate (EB), methyl-p-toluate (MPT), etc., and diethylaluminum chloride. Best selectivity (stereospecificity) is often obtained when the TEA:ester mole ratio is about 2:1. The DEAC, when used, helps in increasing activity. Generally, a TEA:ester:DEAC mole ratio ranging from about 2:1:0.5–3 and preferably about 2:1:2 is employed in bench scale testing for batch polymerization. For a continuous, larger scale process, it becomes possible, for example, when using TEA and MPT to use TEA:MPT mole ratios of about 3:1 to about 5:1 and dispense with the DEAC entirely. A decreased DEAC level is desirable when employing a flash process to recover polymer since the amount of chloride remaining in the polymer is dependent to some extent on the DEAC level.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the monomer is then admitted and maintained at a partial pressure within a range of about 0.5 MPa to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reactor product is continuously withdrawn and the polymer recovered as appropriate, generally by flashing the diluent (solvent)

and unreacted monomers and drying the resulting polymer.

For optimum productivity of polymer of low solubility in the continuous polymerization of propylene preferably the cocatalyst comprising the trialkylaluminum-electron donor is contacted with the titanium-containing catalyst prior to being exposed to liquid propylene.

The olefin polymers made with the catalysts of this invention are useful in preparing articles by conventional polyolefin processing techniques such as injection molding, rotational molding, extrusion of film, and the like.

A further understanding of the present invention and its advantages will be provided by the following examples.

EXAMPLE I

Polymerization Catalyst Production

A typical polymerization catalyst preparation is shown below wherein the $MgCl_2$ source contains about 0.1 mole water per mole $MgCl_2$.

A 30 gal (113 L) Pfaudler reactor was charged with 12 gal (45.4 L) of dry mixed xylenes (commercially available) and 1864.6 g of $MgCl_2$, containing 1.8 weight percent water, previously screened through a 30 mesh sieve (U.S. Sieve Series). The $MgCl_2$ used corresponds to the calculated composition $MgCl_2 \cdot 0.1\ H_2O$. The calculated amount of water present, 1864.6×0.018, is 33.6 g (1.9 moles). The calculated amount of anhydrous $MgCl_2$, 1864.6×0.982, is 1831.0 g (19.2 mole). While stirring the mixture at about 25° C., a second mixture consisting of 780 mL (17.8 moles) of $CH_3OH$ and 780 mL (5.9 moles) of xylene is added over 30 minutes. The calculated mole ratio of anhydrous $MgCl_2$ to methanol is 1.1:1. The resulting stirred mixture was heated for 90 minutes at 45°-50° C.. Reactor and contents were cooled to about 30°-35° C. and 2510.1 g (14.7 moles) of 4-phenylphenol (4-PP) and 7.6 lbs (10.2 moles) of titanium tetra-n-butoxide [$Ti(OBu)_4$] were added. The mixture was heated to 90°-100° C. for 15 minutes, 1.6 lbs (4.84 moles) of ethyl benzoate (EB) was added and the stirred mixture heated an additional 45 minutes at 90°-100° C.. The reactor and contents were cooled to about 50° C. and over a 70 minute period was added 20.8 lbs of ethylaluminum sesquichloride (9.54 moles) as a 25 weight percent solution in n-heptane. The mixture was stirred an additional 45 minutes, cooled to about 30° C., 5 gal (19 L) of n-hexane was added and stirring discontinued. The solids were allowed to settle and the mother liquor decanted. The solids were washed 4 times using 15 gal (57 L) of n-hexane per wash, decanting wash liquor in each instance. To the washed solids was added a specified amount of a mixture produced for example, by admixing 105.6 lbs (47.9 kg) of $TiCl_4$, 61.2 lbs (27.8 kg) of $HSiCl_3$ and 27.0 lbs (12.3 kg) of $SiCl_4$. Such a mixture is calculated to be 54.5 wt. % (47.6 mole %) $TiCl_4$, 31.6 wt. % (38.7 mole %) $HSiCl_3$ and 13.9 wt. % (13.7 mole %) $SiCl_4$.

The mixture was heated to 90°-100° C. for a specified time while stirring. It was then cooled to about 30° C., 5 gal of n-hexane was added, stirring was discontinued. The catalyst solids were allowed to settle and the liquor was decanted. The solids were washed 6 times with 15 gal portions of n-hexane as before and transferred to a receiver for storage or treated as follows:

In the invention runs, the halide-treated catalyst solids, after washing, were again contacted with the halides mixture. The mixture was heated to 90°-100° C. for about 0.5 to 1 hour with stirring and washed as before. The washed solids were transferred to a receiver for storage.

A series of catalysts was prepared in the general manner described above from $MgCl_2$ associated with about 0.07 to about 0.15 mole water per mole $MgCl_2$ (calculated) and with about 0.89 to about 0.93 mole methanol per mole $MgCl_2$ (calculated).

The calculated quantity of anhydrous $MgCl_2$ employed in preparing the catalysts varied from 925 g to 1846 g. The calculated mole ratios of reactants employed in preparing the catalyst precursor and the calculated weight ratios of halides mixture to calculated anhydrous $MgCl_2$ employed in activating the catalyst precursors are set forth in Table I.

TABLE I

| | Polymerization Catalysts | | | | | | |
|---|---|---|---|---|---|---|---|
| | Calculated Mole Ratio | | | | Calculated Weight Ratio | | |
| Catalyst | $MgCl_2$ | 4-PP | EB | EASC | Halide Mixture: $MgCl_2$ | | |
| No | $Ti(OBu)_4$ | $Ti(OBu)_4$ | $Ti(OBu)_4$ | $Ti(OBu)_4$ | 1st | 2nd | Total |
| 1 | 1.97 | 1.47 | 0.48 | 0.94 | 14.8 | 0 | 14.8 |
| 2 | 1.90 | 1.44 | 0.47 | 0.94 | 15.2 | 0 | 15.2 |
| 3[a] | 1.92 | 1.45 | 0.48 | 0.94 | 15.7 | 0 | 15.7 |
| 4 | 1.88 | 1.44 | 0.47 | 0.94 | 15.8 | 0 | 15.8 |
| 5 | 1.90 | 1.44 | 0.47 | 0.94 | 11.4 | 0 | 11.4 |
| 6 | 1.89 | 1.45 | 0.47 | 0.94 | 7.90 | 0 | 7.90 |
| 7 | 1.88 | 1.44 | 0.47 | 0.94 | 5.45 | 2.48 | 7.93 |
| 8 | 1.89 | 1.46 | 0.47 | 0.94 | 7.89 | 3.94 | 11.8 |
| 9 | 1.87 | 1.46 | 0.47 | 0.94 | 16.0 | 0 | 16.0 |
| 10 | 1.93 | 1.44 | 0.48 | 0.94 | 3.90 | 3.90 | 7.80 |
| 11 | 1.95 | 1.45 | 0.48 | 0.94 | 3.97 | 3.86 | 7.72 |
| 12[b] | 1.90 | 1.44 | 0.47 | 0.94 | 9.65 | 3.94 | 13.6 |

[a]The catalyst contained ethylene "prepolymer". It was added by contacting the washed catalyst precursor prior to treating with the mixed halides mixture with 10 gal (37.8 L) of n-hexane, 340 g (1.38 moles) of EASC (same concentration as before) and 0.4 lb (181 g) of ethylene. After 15 minutes the initial pressure decreased from about 30 psia (0.21 MPa) to about 26 psia (0.18 MPa). The reactor was flushed with dry nitrogen, the solids allowed to settle and washed twice using 15 gal of n-hexane per wash. Therewith, the catalyst precursor containing a prepolymer coating was treated with the halides mixture as before.
[b]Catalyst 12 was formed by combining portions of catalysts 5 and 6 and reactivating. The calculated weight ratio of halide mixture to $MgCl_2$ in the first activation is the average of the previous reported values, e.g. 11.4 + 7.9 ÷ 2 = 9.65. The weight ratio for the reactivation was 3.94.

EXAMPLE II

Propylene Polymerization

A sample of each catalyst was tested in propylene polyermization for 1 hour at 70° C. by employing a liquid full, 3.8 liter stirred stainless steel reactor in the presence of the specified cocatalyst system and hydrogen, if used. A typical cocatalyst system, for example, can consist of a premixed composition containing about 7.74 mmoles triethylaluminum (TEA) and 3.76 mmole methyl p-toluate (MPT) which is used in combination with 7.54 mmoles of diethylaluminum chloride (DEAC). The resulting mole ratio of TEA:MPT:DEAC is about 2:1:2.

Prior to each run, the reactor was conditioned by filling it about ½ full with n-hexane dried with alumina and then heating reactor and contents with stirring for about 10–15 minutes at over 100° C., e.g. 135° C.. Heating and stirring were discontinued, the reactor contents were drained, the reactor was flushed with dry nitrogen and then with propylene vapor.

While continuing the propylene purge, through an entry port in the reactor was charged in order, the TEA.MPT mixture, the solid catalyst, the DEAC and hydrogen, if used. The port was sealed and 3 liters of liquid propylene was added to the reactor. The hydrogen was added from a pressurized container of known volume in terms of pressure drop, e.g. 10 psi. Heating was started. When the desired reactor temperature was reached, e.g. 70° C., the reactor was filled liquid full with propylene and maintained liquid full during the run by means of a propylene reservoir open to the reactor overpressured with dry nitrogen, e.g. about 515 psia (3.55 MPa).

Each run was terminated by discontinuing the propylene feed, pressuring in about 5 mL methanol with nitrogen, and cooling the reactor to about 30° C. Stirring was discontinued and the liquid propylene was drained from the reactor into a dry, tared container. The reactor was filled with fresh propylene and the contents were stirred several minutes to wash the polymer. The wash propylene was then discharged to the tared container.

The polymer in the reactor was recoverd, dried if necessary, to remove volatile hydrocarbons and weighed to determine the yield. The polymer can be stabilized by slurrying it in an acetone solution containing a conventional antioxidant system for polypropylene and the solvent removed by heating the mixture for about 3 hours at 60° C. in a vacuum oven.

Propylene-soluble polymer contained in the propylene in the tared vessel was determined by heating the vessel to dryness in a vacuum oven at about 60° C.. The vessel was then weighed to ascertain the weight of residue remaining. Xylene-soluble polymer, calculated productivity of the solid catalyst, and other physical properties of the polymer, if specified, are determined by methods disclosed in U.S. Pat. 4,384,087.

The results obtained are presented in Table II and III.

TABLE II

Propylene Polymerization At 70° C., Comparison Runs
Single 1 Hour Activation

| Run No | Solid Catalyst No | Wt. mg | Polymer yield, g Sol. | Polymer yield, g Insol. | Productivity[a] kg/g cat/hr | Solubles Wt. % Prop. | Solubles Wt. % Xylene | Solubles Wt. % Total | Polymer Melt flow g/10 min | Catalyst Activation Wt. Ratio Halides MgCl₂ |
|---|---|---|---|---|---|---|---|---|---|---|
| 1 | 1 | 23.3 | 3.1 | 354 | 15.2 | 0.9 | 2.3 | 3.2 | —[b] | 14.8 |
| 2 | 2 | 31.4 | 2.1 | 351 | 11.2 | 0.6 | 1.8 | 2.4 | 0.64 | 15.2 |
| 3 | 3 | 39.8 | 4.6 | 441 | 11.1 | 1.0 | 4.5 | 5.5 | 2.0[c] | 15.7 |
| 4 | 4 | 20.0 | 1.4 | 205 | 10.3 | 1.2 | 1.7 | 2.9 | 1.2 | 15.8 |
| 5 | 9 | 14.1 | 3.4 | 288 | 20.4 | 1.2 | 2.9 | 4.1 | 3.1 | 16.0 |
| 6 | 5 | 17.2 | 1.8 | 233 | 13.5 | 0.8 | 1.4 | 2.2 | 1.8 | 11.4 |
| 7 | 6 | 25.0 | 2.1 | 190 | 7.6 | 1.0 | 1.8 | 2.8 | 2.1 | 7.90 |

[a]Based on propylene insoluble polymer
[b]Not determined
[c]Bulk density of polymer was 0.38 g/cc The productivity values ranging from about 10 to about 20 or more kg polypropylene per g solid catalyst per hour at 70° C. as shown in runs 1–6 of Table II are typical for catalysts made as described and tested in a 1 gal reactor. At least than about 10 lbs halide mixture per lb. MgCl₂ the catalyst productivity declines as the 7.6 kg of polypropylene per g catalyst in run 7 illustrates.

Multiple activation of the catalyst precursor with fresh portions of the halide mixture and the attendant effects on productivity are shown in Table III. Runs 6, 7, of Table II are repeated for convenience in comparing results.

TABLE III

Propylene Polymerization At 70° C.

| Run No | Solid Catalyst No | Wt. mg | Polymer yield, g Sol. | Polymer yield, g Insol. | Productivity[a] kg/g cat/hr | Catalyst Activation Total Wt. Ratio Halides MgCl2 | Time, Hours 1st | Time, Hours 2nd | Solubles Wt. % Prop. | Solubles Wt. % Xylene | Solubles Wt. % Total | Polymer Melt flow g/10 min |
|---|---|---|---|---|---|---|---|---|---|---|---|---|
| 6 | 5 | 17.2 | 1.8 | 233 | 13.5 | 11.4 | 1 | 0 | 0.8 | 1.4 | 2.2 | 1.8 |
| 7 | 6 | 25.0 | 2.1 | 190 | 7.6 | 7.90 | 1 | 0 | 1.0 | 1.8 | 2.8 | 2.1 |
| 8 | 7 | 17.1 | 1.3 | 138 | 8.1 | 5.45 | 1.5 | 0 | 0.9 | 2.0 | 2.9 | 1.3 |
| 9 | 7 | 25.1 | 2.1 | 239 | 13.4 | 7.93 | 1.5 | 1 | 2.1 | 1.7 | 3.8 | 1.7 |
| 10 | 8 | 7.1 | 1.2 | 64 | 9.0 | 7.89 | 2 | 0 | 1.2 | 2.2 | 3.4 | 2.1 |
| 11 | 8 | 13.4 | 5.1 | 300 | 22.4 | 11.8 | 2 | 1 | 1.7 | 3.0 | 4.7 | 4.1 |
| 12 | 12 | 27.5 | 5.3 | 547 | 19.9 | 13.6 | 1 | 1 | 1.0 | 2.3 | 3.3 | 1.5[b] |
| 13 | 10 | 14.1 | 2.1 | 83 | 5.5 | 3.90 | 1 | 0 | 2.5 | 2.4 | 4.9 | 2.6[c] |

TABLE III-continued

| | | Solid Catalyst | | Polymer yield, g | | | Propylene Polymerization At 70° C. | | | | | |
| | | | | | | | Catalyst Activation | | | | | |
| | | | | | | | Total Wt. Ratio Halides | Time, Hours | | Solubles Wt. % | | | Polymer Melt flow |
| Run No | No | Wt. mg | Sol. | Insol. | Productivity[a] kg/g cat/hr | MgCl2 | 1st | 2nd | Prop. | Xylene | Total | g/10 min |
|---|---|---|---|---|---|---|---|---|---|---|---|---|
| 14 | 10 | 15.2 | 2.0 | 158 | 11.1 | 7.80 | 1 | 1 | 1.3 | 2.1 | 3.4 | 2.9[d] |
| 15 | 11 | 24.9 | 2.4 | 139 | 5.6 | 3.86 | 0.5 | 0 | 1.7 | 2.3 | 4.0 | 1.3[e] |
| 16 | 11 | 14.0 | 3.0 | 169 | 12.1 | 7.72 | 0.5 | 0.5 | 1.7 | 2.5 | 4.2 | 2.1[f] |

[a]Based on propylene insuluble polymer
[b]Polymer bulk density of 0.38 g/cc
[c]Molded polymer density of 0.9119 g/cc and flexural modulus of 1864 MPa
[d]Molded polymer density of 0.9104 g/cc and flexural modulus of 1743 MPa
[e]Molded polymer density of 0.9109 g/cc and flexural modulus of 1789 MPa
[f]Molded polymer density of 0.9119 g/cc and flexural modulus of 1743 MPa The effect of reducing the weight ratio of the halide mixture to MgCl2 in single activations of 1 to 2 hours are shown in comparsion runs 6, 7, 8, 10, 13 and 15 of Table III. As the weight ratio decreases from 11.4 to 3.86:1, the productivity declines from 13.5 to 5.6 kg polypropylene per g catalyst per hour.

At a total weight ratio of halide mixture to MgCl2 of about 7.9:1 and employing a single activation as in runs 7 and 10 a productivity of about 7.6 to 9 kg polymer per g catalyst per hour are realized. However, when double activations are employed with a total weight ratio of halide mixture to MgCl2 of about 7.9:1, the productivities are substantially increased as shown in invention runs 9 (13.4 kg polymer), 14 (11.1 kg polymer) and 16 (12.1 kg polymer).

The productivity of 22.4 kg polymer in run 11 and 19.9 kg polymer in run 12 indicate that productivity results as least as good as those with single activations as in runs 1, 9 of Table II utilizing a halides mixture:MgCl2 weight ratio of about 15-16:1 can be obtained in double activations while reducing the weight ratio of the components to about 12-14:1.

It is most desirable to reduce the amount of halides employed in catalyst activation not only in the initial cost of the reagents but also in reducing the cost of rendering used reagents after activation to environmentally safe products or in recycling the reagents.

What is claimed is:

1. A process for preparing a catalyst comprising (1) forming a first catalyst component by reacting reactants comprising (A) a metal dihalide selected from Groups IIA and IIB of the Periodic Table and (B) a transition metal compound wherein the transition metal is selected from Groups IVB and VB and is bonded to at least one atom selected from the group consisting of oxygen, nitrogen, and sulfur, which atom is in turn bonded to a carbon of a carbon containing radical; (2) reacting said first component with a precitating agent selected from the group consisting of (a) organometallic compounds of Groups I, II, and III selected from lithium alkyls, Grignard reagents, dialkyl magnesium compounds, dialkyl zinc compunds, and hydrocarbylaluminum halides; (b) metal halides and oxyhalides of Groups IIIA, IVA, IVB, and VB; (c) hydrogen halide; and (d) organic acid halides of the formula

wherein R is an alkyl, aryl, or cycloalkyl group or combination thereof and X is a halide; (3) reacting the solid from step (2) with a first portion of an activating component, and (4) reacting the solid from step (3) with at least one more portion of an activating component, wherein said activating component is free of electron donor and comprises at least one halogen-containing compound of elements of Groups IVA, VA, IVB, and VB.

2. A process according to claim 1 wherein said metal dihalide comprises MgCl2.

3. A process according to claim 2 wherein said activating component comprises at least one chlorine-containing compound of Si, Ge, Sn, P, C Ti, V, and Zr.

4. A process according to claim 3 wherein said transition metal compound is selected from compunds of the formula Ti(OR)4 wherein each R is individually selected from alkyl groups containing 1 to 20 carbon atoms.

5. A process according to claim 4 wherein said precipitating agent comprises an organoaluminum halide.

6. A process according to claim 5 wherein said activating component comprises TiCl4.

7. A process according to claim 6 wherein said activiting component comprises TiCl4, SiCl4 and HSiCl3.

8. A process for preparing a catalyst comprising (1) forming a first catalyst component by reacting reactants comprising (A) magnesium dichloride and (B) a transition metal compound selected from compounds of the formula Ti(OR)4 wherein each R is individually selected from alkyl groups containing 1 to 70 carbon atoms; (2) reacting said first component with a precipitating agent comprising an organoaluminum halide; (3) reacting the solid from step (2) with a first portion of an activating component, and (4) reacting the solid from step (3) with at least one more portion of an activating component, wherein said activating component is free of electron donor and comprises TiCl4.

9. A process according to claim 8 wherein said activating component comprises TiCl4, SiCl4 and HSiCl3.

10. A process according to claim 9 wherein the molar ratio of TiCl4 to SiCl4 is the range of 3/1 to 4.5/1 and the molar ratio of HSiCl3 to SiCl4 is the range of 2.5/1 to 4/1.

11. A process according to claim 10 wherein said transition metal compound comprises titanium tetra-n-butoxide.

12. A process according to claim 11 wherein a benzoic acid ester and a phenol are employed in the preparation of the first catalyst component.

13. A process according to claim 12 wherein ethyl benzoate and 4-phenyl phenol are employed in the preparation of the first catalyst component and ethyl aluminum sesquichloride is employed in the precipitating agent.

14. A process according to claim 13 wherein said metal dihalide comprises MgCl₂ and methanol and the molar ratio of methanol to MgCl₂ is about 0.2/1 to about 1.5/1.

15. A process according to claim 14 wherein the activation steps are carried out at a temperature in the range of about 40° C. to about 100° C.

16. A process according to claim 13 wherein said metal dihalide comprises MgCl₂ containing 0.5 to 1.5 moles of water per mole of MgCl₂.

17. A catalyst produced by the process of claim 1.

18. A catalyst produced by the process of claim 15.

19. A catalyst produced by the process of claim 16.

20. A process for preparing a catalyst comprising (1) forming a first catalyst component by reacting reactants comprising (A) a metal dihalide selected from Groups IIA and IIB of the Periodic Table and (B) a transition metal compound wherein the transition metal is selected from Groups IVB and VB and is bonded to at least one atom selected from the group consisting of oxygen, nitrogen, and sulfur, which atom is in turn bonded to a carbon of a carbon containing radical; (2) reacting said first component with a precipitating agent selected from the group consisting of (a) organometallic compounds of Groups I, II, and III selected from lithium alkyls, Grignard reagents, dialkyl magnesium compounds, dialkyl zinc compounds, and hydrocarbylaluminum halides; (b) metal halides and oxyhalides of Groups IIIA, IVA, IVB, and VB; (c) hydrogen halide; and (d) organic acid halides of the formula

wherein R is an alkyl, aryl, or cycloalkyl group or combination thereof and X is a halide; (3) reacting the solid from step (2) with a first portion of an activating component, and (4) reacting the solid from step (3) with at least one more portion of an activating component, wherein said activating component comprises TiCl₄, SiCl₄ and HSiCl₃.

21. A process according to claim 20 wherein said metal dihalide comprises MgCl₂.

22. A process according to claim 21 wherein said transition metal compound is selected from compounds of the formula Ti(OR)₄ wherein each R is individually selected from alkyl groups containing 1 to 20 carbon atoms.

23. A process according to claim 22 wherein said precipitating agent comprises an organoaluminum halide.

* * * * *